(12) United States Patent
Yang et al.

(10) Patent No.: US 9,136,676 B2
(45) Date of Patent: Sep. 15, 2015

(54) ELECTROMAGNETIC TOOL FOR WIRE ROUTING

(75) Inventors: XinHua Yang, Aurora, CO (US); Bin Xu, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 179 days.

(21) Appl. No.: 13/358,552

(22) Filed: Jan. 26, 2012

(65) Prior Publication Data

US 2013/0193388 A1 Aug. 1, 2013

(51) Int. Cl.
| B60S 9/22 | (2006.01) |
| H02G 1/08 | (2006.01) |
| B22F 7/06 | (2006.01) |
| B22F 1/00 | (2006.01) |

(52) U.S. Cl.
CPC ... *H02G 1/08* (2013.01); *B22F 1/00* (2013.01); *B22F 7/062* (2013.01)

(58) Field of Classification Search
USPC .................................................. 254/134.3 R
See application file for complete search history.

(56) References Cited

U.S. PATENT DOCUMENTS

| 1,946,037 A * | 2/1934 | Scott ..................... 254/134.3 FT |
| 3,078,073 A * | 2/1963 | Zizzo ..................... 254/134.3 R |
| 3,971,543 A * | 7/1976 | Shanahan ............... 254/134.3 R |
| 4,309,610 A * | 1/1982 | Hillemeier ..................... 250/342 |
| 4,466,207 A * | 8/1984 | Salam ............................. 40/449 |
| 4,527,775 A * | 7/1985 | Flowers ............... 254/134.3 FT |
| 4,572,561 A * | 2/1986 | Hale ............................. 294/65.5 |
| 4,917,362 A * | 4/1990 | Wilson ................. 254/134.3 FT |
| 5,377,847 A * | 1/1995 | Kind ............................. 209/655 |
| 5,505,432 A * | 4/1996 | Noonan ............... 254/134.3 FT |
| 5,522,630 A * | 6/1996 | James ......................... 294/65.5 |
| 5,844,140 A * | 12/1998 | Seale ............................. 73/633 |
| 6,215,293 B1 * | 4/2001 | Yim ............................. 324/67 |
| 6,397,570 B1 * | 6/2002 | Bohrer et al. ............... 56/10.2 J |
| 6,742,301 B1 * | 6/2004 | Schwarz ......................... 49/42 |
| 6,824,329 B2 * | 11/2004 | Van Bijsterveld et al. .... 405/184 |
| 7,051,999 B2 * | 5/2006 | Hewitt ................... 254/134.3 R |
| 7,093,822 B2 * | 8/2006 | Welker ................... 254/134.3 R |
| 7,156,373 B2 * | 1/2007 | Turner ................. 254/134.3 FT |
| 7,648,122 B2 * | 1/2010 | Turner ................. 254/134.3 FT |
| 7,758,021 B2 * | 7/2010 | Welker ................... 254/134.3 R |
| 7,762,530 B2 * | 7/2010 | Kim ..................... 254/134.3 FT |
| 7,832,709 B2 * | 11/2010 | O'Connor ............. 254/134.3 R |
| 8,186,650 B2 * | 5/2012 | Turner ................. 254/134.3 FT |
| 8,234,791 B2 * | 8/2012 | Tweedie ......................... 33/542 |
| 8,272,892 B2 * | 9/2012 | McNeely et al. ............. 439/577 |
| 2004/0211949 A1 * | 10/2004 | Turner ................. 254/134.3 FT |
| 2005/0285088 A1 * | 12/2005 | Welker ................. 254/134.3 FT |
| 2005/0285089 A1 * | 12/2005 | Welker ................. 254/134.3 FT |

* cited by examiner

*Primary Examiner* — Lee D Wilson
*Assistant Examiner* — Alvin Grant
(74) *Attorney, Agent, or Firm* — Kilpatrick Townsend & Stockton LLP

(57) ABSTRACT

Various arrangements for remotely manipulating a wire may be presented. A wire pilot may be presented that is configured to be coupled with the wire and to move in response to a magnetic field created by a remote guide when the wire pilot is within a wall and the remote guide is external to the wall. The remote guide may include a magnetic field generator configured to create the magnetic field and a metal detector configured to detect wires through a wall.

18 Claims, 7 Drawing Sheets

ELECTROMAGNETIC TOOL FOR WIRE ROUTING

BACKGROUND

While a wall is being built, wiring the wall is fairly straightforward. Typically, wiring is performed before drywall (or some other surfacing material, such as plaster) is hung and/or insulation installed. Thus, during the building process, the installer has ready access and good visibility to see how a wire should be routed within the wall. For instance, holes may be drilled through studs in the wall to allow wires associated with electricity, speakers, a network, satellite television, cable television, or an antenna to be routed between various locations. Following the wiring being completed, the drywall (or some other surface material) may be hung such that the wiring is concealed within the wall.

Attempting to wire a wall after the wall has been fully constructed (such as years later) may present significant challenges. First, because drywall has already been hung, it may be difficult to visualize the locations of preexisting objects within the wall, such as wires, studs, and/or insulation that needs to be avoided during the wiring process. Second, the presence of drywall may make access to the inside of the wall difficult. As such, multiple holes may be made in the drywall to allow temporary access for an installer to determine the locations of objects within the wall and/or to allow for physical manipulation (e.g., pulling, pushing) of the wire to be installed between its origin and destination.

As such, following installation of a wire in a preexisting wall, the wall may be left with one or more unsightly holes in the drywall that serve no additional purpose once the wire has been routed. As such, due to such potential damage to a wall, a person may be less willing to allow installation of the wire within the wall and/or the equipment associated with the wire.

SUMMARY

Various arrangements for remotely manipulating a wire are presented. In some embodiments, an apparatus configured to remotely manipulate a wire are presented. The apparatus may include a wire pilot. The wire pilot may be configured to be coupled with the wire and to move in response to a magnetic field created by a remote guide when the wire pilot is within a wall and the remote guide is external to the wall. The apparatus may include a remote guide. The remote guide may include a magnetic field generator configured to create the magnetic field. The remote guide may also include a metal detector configured to detect wires within the wall.

Various embodiments of such an apparatus may include one or more of the following: The apparatus may include a wire snake configured to be coupled with the wire pilot. The wire snake may be configured to allow mechanical force to be applied to the wire pilot by a user while the remote guide is being used to create the magnetic field to move the wire pilot. The magnetic field generator may be further configured to create the magnetic field at least partially based on user input. The apparatus may include a beacon configured for use in determining a distance between the beacon and the remote guide, wherein the remote guide is further configured to output an indication of the distance between the beacon and the remote guide. The remote guide may include a stud finder. The metal detector is further configured to distinguish the wire pilot from the wires.

In some embodiments, a method for remotely manipulating a wire within a wall is presented. The method may include providing a wire pilot and a remote guide. The wire pilot may be configured to be coupled with the wire and to move in response to a magnetic field generated by the remote guide when the wire pilot is within an interior of the wall and the remote guide is external to the wall. The method may include attaching the wire to the wire pilot. The method may include inserting the wire pilot and the attached wire into the interior of the wall. The method may include locating the wire pilot using the remote guide. The method may include guiding, using the magnetic field generated by the remote guide, the wire pilot and the attached wire to a destination within the interior of the wall.

Various embodiments of such a method may include one or more of the following: Guiding the wire pilot and the attached wire to the destination within the interior of the wall may include activating and deactivating the magnetic field generated by the remote guide. The method may include locating a previously routed wire within the interior of the wall using the remote guide. The method may include locating a stud within the interior of the wall using the remote guide. The method may include attaching the wire pilot and the attached wire to a wire snake. Guiding, using the magnetic field generated by the remote guide, the wire pilot and the attached wire to the destination within the interior of the wall further may include moving the wire pilot and attached wire using the wire snake. The remote guide may be operated by a first user and the wire snake is operated by a second user. The method may include attaching a beacon to the wall. The method may include determining, using the remote guide, a distance between the remote guide to the beacon and a direction from the remote guide to the beacon. Guiding, using the magnetic field generated by the remote guide, the wire pilot and the attached wire to the destination within the interior of the wall may include passing through a preexisting hole within a stud present within the interior of the wall.

In some embodiments, an apparatus for remotely manipulating a wire within a wall may be presented. The apparatus may include a first means for coupling with the wire. The first means may be configured to move in response to a magnetic field when the first means is within an interior of the wall. The apparatus may include a second means for locating the first means within the interior of the wall. The apparatus may include third means for guiding, using the magnetic field, the first means and the attached wire to a destination within the interior of the wall.

Various embodiments of such an apparatus may include one or more of the following: The apparatus may include a fourth means for locating a previously routed wire within the interior of the wall. The apparatus may include a fifth means for locating a stud within the interior of the wall. The apparatus may include a sixth means configured to couple with the first means and move the first means while the third means is being used to guide the first means and the attached wire to the destination within the interior of the wall.

DETAILED DESCRIPTION

Figure 1:
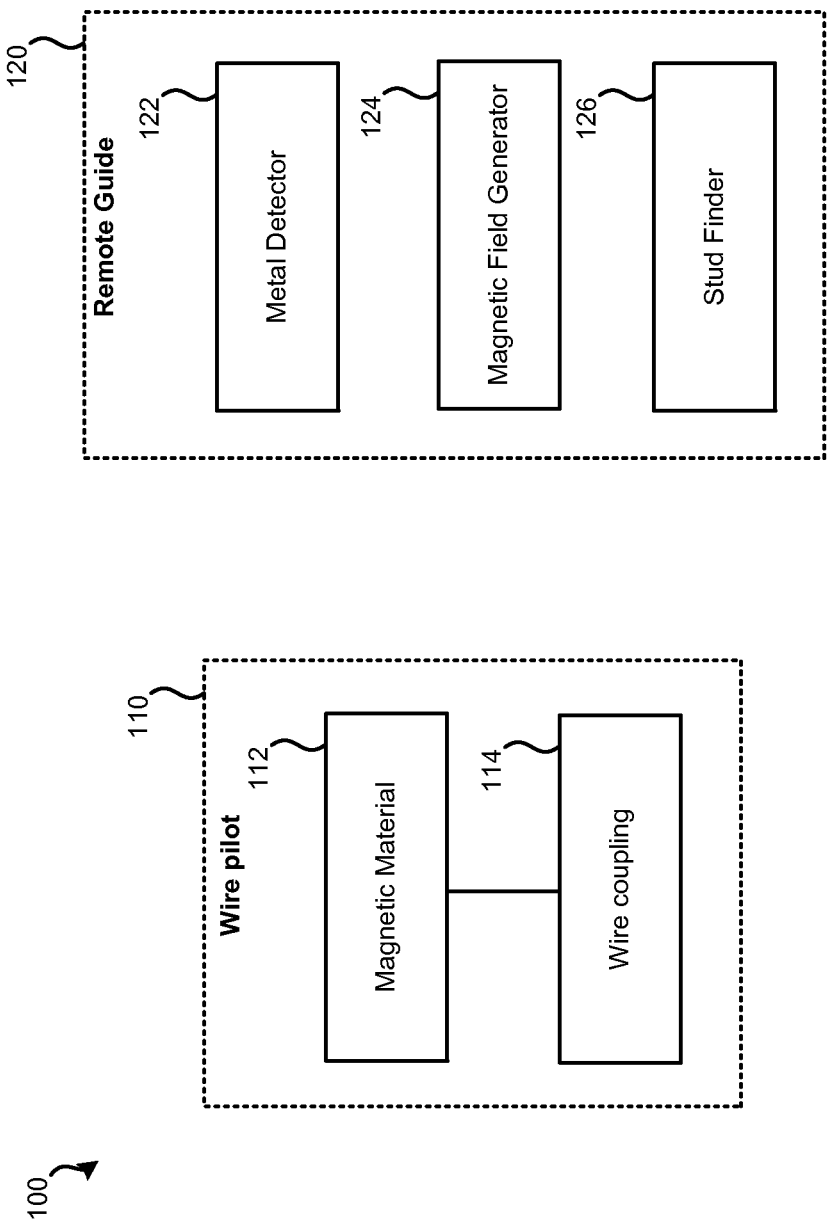
FIG. 1 is a block diagram of an embodiment of a system configured for remotely manipulating a wire.

Rather than cutting multiple holes in an existing wall to allow for routing of a wire being installed, a magnet may be used to guide the wire from an entry point (where the wire enters the wall) to an exit point (where the wire is desired to terminate or exit the wall). A wire pilot may be coupled with the wire. The wire pilot may be at least partially made of a magnetic material and may be shaped to facilitate movement through and/or around objects present within a wall. A remote guide may be configured to generate a magnetic field strong enough to move the wire pilot when the wire pilot is within a wall. As such, by moving the remote guide along the outside of the wall, the wire pilot, and the wire coupled with the wire pilot, can be manipulated with fewer holes being made in the wall.

The remote guide may be configured to perform additional functions to assist in routing a wire through an existing wall. In some embodiments, the remote guide may be configured to detect the location of studs within the wall. The remote guide may also be configured to detect the location of previously installed wires within the wall. Detecting previously installed wires may permit a wire being installed to be routed through preexisting holes in studs within the wall that already are used to route the previously installed wires. As such, rather than using an attic or basement to route a wire, the wire may be routed through preexisting holes in the studs of the wall.

In some embodiments, a wire snake may be used in conjunction with the wire pilot and the remote guide. For example, when the remote guide is being used to guide the wire pilot within a wall, insulation present within the wall may adversely affect the ability to manipulate the wire pilot via the magnetic field generated by the remote guide. As such, a wire snake may be coupled with the wire pilot such that additional force may be applied to the wire pilot, possibly while the remote guide is being used to manipulate the wire pilot. As such, the wire snake may be used to provide the majority of the force necessary to move the wire pilot, while the remote guide is used to adjust the direction the wire pilot is being moved. Such a wire snake may be used to mechanically pull the wire pilot. Such a wire snake may be firm, to allow mechanically pushing of the wire pilot, such as through a hole in the wall where the wire and wire pilot were inserted.

In some embodiments, a beacon may be used to determine a distance from the beacon to a remote guide. Such a beacon may be useful when routing a wire through a wall involves entry and exit points in different rooms or locations, such as a wire being routed from an attic to a bedroom. The beacon may be used to determine where the wire pilot should be located in order to decrease the possibility of having to create a hole in a wall to visually find the wire pilot. The beacon may also be used to determine the shortest distance between two points. For example, if the beacon is placed on a first side of a wall, the shortest distance on the opposite side of the wall may indicate a point directly opposite the beacon.

FIG. 1 is a block diagram of an embodiment of a system 100 configured for remotely manipulating a wire. System 100 may include wire pilot 110 and remote guide 120. Wire pilot 110 may be configured to be remotely manipulated via a magnetic field by remote guide 120.

Wire pilot 110 may include magnetic material 112 and wire coupling 114. Wire pilot 110 may be configured to couple with one or more wires that are to be installed within a preexisting wall. As such, wire pilot 110 may be configured to couple with the wire that is to be installed before the wire is inserted within the wall and may be removed from the wire once the wire has been routed within the wall. Wire pilot 110 may also be used to route an object besides wire, such as string. After string has been routed, it may be tied to a wire to allow the wire to be pulled through the wall (and then routed). Wire pilot 110 may be wholly or partly made from magnetic material 112. Magnetic material 112, such as iron, may allow wire pilot 110 and the coupled wire to be moved by a magnetic field. Such a magnetic field may be generated by remote guide 120. Wire pilot 110 may include wire coupling 114. Wire coupling 114 may be configured to couple wire pilot 110 to the wire to be installed within the wall. Wire pilot 110 may be shaped to facilitate movement within the wall. For example, the shape of wire pilot 110 may be pointed to facilitate movement past or through obstacles (e.g., other wires, plaster buildup, insulation, studs) within the wall. Having wire pilot 110 be pointed may facilitate moving wire pilot 110 through preexisting holes within studs inside of the wall.

Remote guide 120 may include: metal detector 122, magnetic field generator 124, and stud finder 126. Metal detector 122 may be configured to allow detection of metal within a wall. Detecting metal within a wall may permit other wires that are already installed within the wall to be located. Locating other wires within the wall may be useful for several reasons: such wires may be desired to be avoided (e.g., interference from an AC current present on electrical wires routed to outlets); or such wires may indicate a potential routing path for a wire to be installed within the wall. For example, if a previously installed wire runs horizontally within a wall, it may be determined that holes are present within studs inside the wall to allow the previously installed wire to run in such a direction. Such preexisting holes within the studs may be used to route one or more wires to be added within the wall. Alternatively, if use of metal detector 122 of remote guide 120 indicates that previously installed wires within the wall are run only substantially vertically (such as, to a basement or attic), this information may be used to determine that attempting to route a wire to be installed within the wall horizontally may be difficult (e.g., no holes within the studs may already be present).

In addition to detecting previously installed wires within the wall, metal detector 122 may be used to detect the location of wire pilot 110. For instance, once wire pilot 110 has been inserted within a wall, an installer may not be able to see wire pilot 110. As such, metal detector 122 may be used to determine the location of wire pilot 110 within the wall. As a more specific example of when metal detector 122 may be useful to detect wire pilot 110, consider the following example, provided for illustration purposes only: an installer wishes to route a wire in a preexisting wall vertically, such as from an attic to near a baseboard within the wall. The new wire, with the wire pilot coupled, may be lowered vertically into the wall from the attic. Next, the installer may locate the position of the wire pilot through the wall using metal detector 122. Now that the installer knows the location of wire pilot 110, remote guide 120 may be used to route the wire horizontally.

Remote guide 120 and metal detector 122 may be configured to differentiate between a wire within a wall and wire pilot 110. As such, when an installer does not know where wire pilot 110 is located within the wall, using metal detector 122 of remote guide 120, the installer may be able to determine whether metal located within the wall is part of a wire or wire pilot 110. A display or some other form of providing an indication to the user may be used to indicate whether metal detected within a wall is a previously installed wire or wire pilot 110, as determined by remote guide 120.

Magnetic field generator 124 of remote guide 120 may be used to generate a magnetic field that can move wire pilot 110. Magnetic field generator 124 may include a permanent magnet that creates a magnetic field. Magnetic field generator 124 may also be configured to only generate a magnetic field upon receiving an indication from a user. Such a magnetic field generator may include an electromagnet. As such, magnetic field generator 124 may be used to remotely manipulate wire pilot 110 due to wire pilot 110 being completely or partially made from magnetic material 112. Magnetic field generator 124 may generate a strong enough magnetic field such that wire pilot 110 may be moved when one or more objects are between wire pilot 110 and remote guide 120. Typical objects that may be between wire pilot 110 and remote guide 120 include drywall, plaster, studs, and/or insulation.

Remote guide 120 may also include stud finder 126. Stud finder 126 may be used to locate studs within a wall. Knowing the position of studs may be important to determine whether a wire should be run vertically (such as along a stud) or horizontally.

Figure 2:
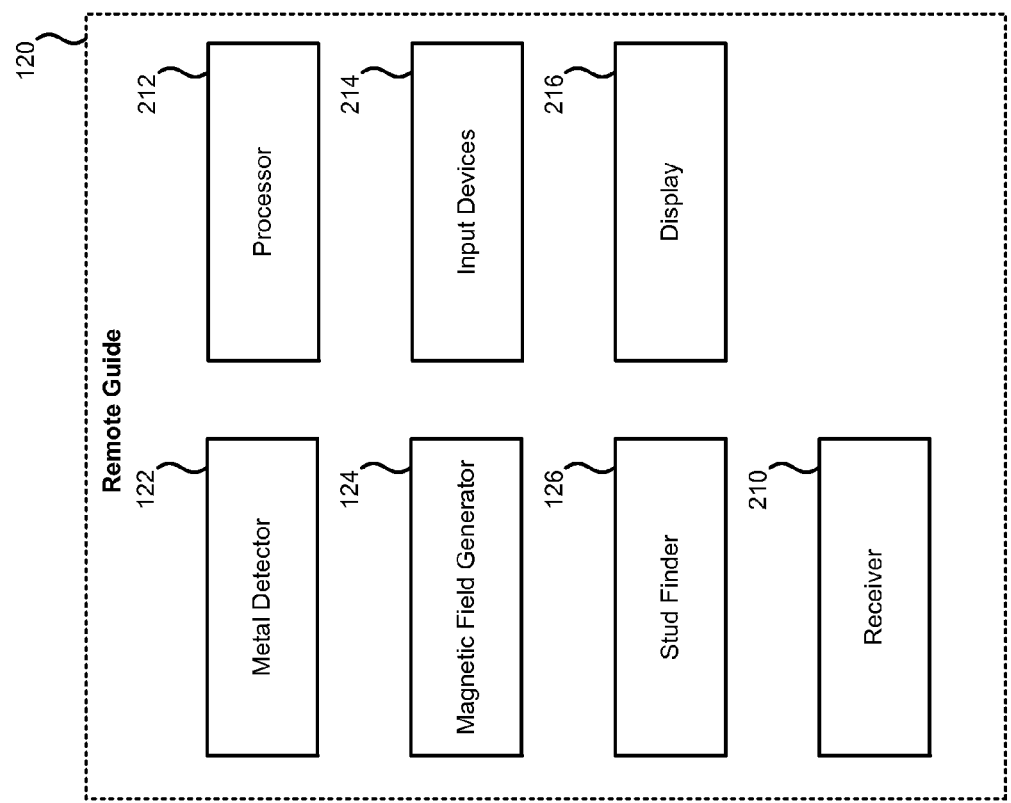
FIG. 2 is a block diagram of another embodiment of a system configured for remotely manipulating a wire.
Figure 2:
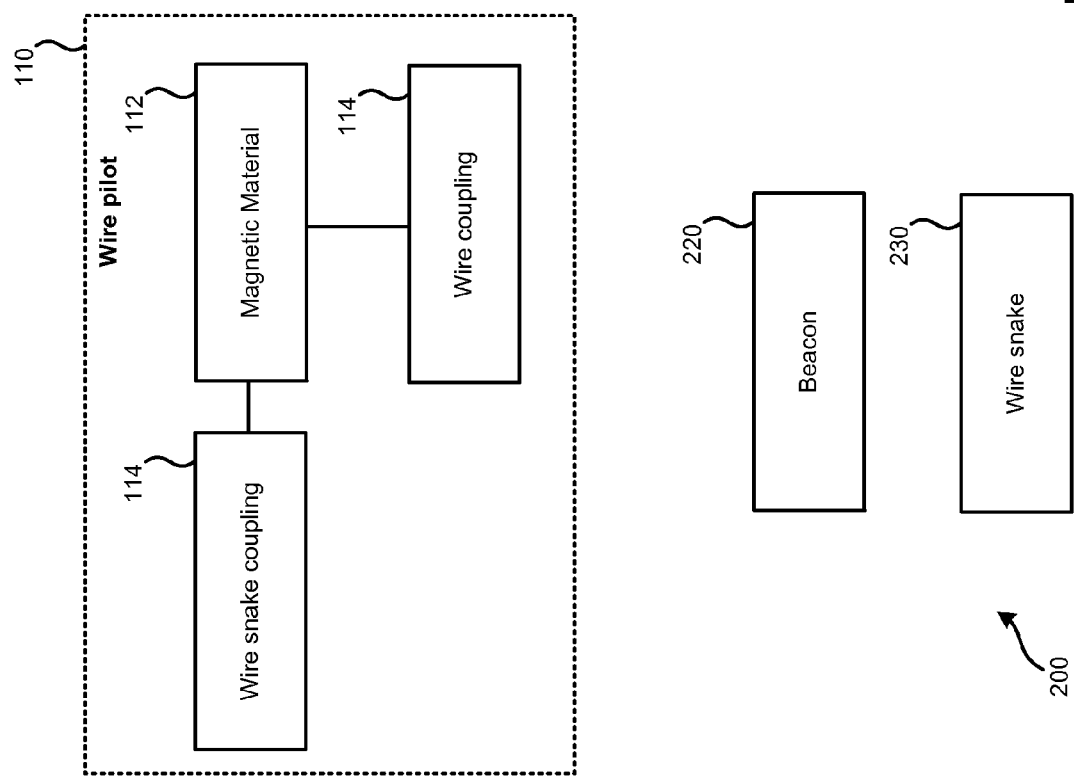

FIG. 2 is a block diagram of an embodiment of a system 200 configured for remotely manipulating a wire. System 200 may represent an embodiment of system 100. System 200 may include: wire pilot 110, remote guide 120, beacon 220, and wire snake 230.

Wire pilot 110 may be configured as detailed in relation to system 100 of FIG. 1. In system 200, remote guide 120 may include metal detector 122, magnetic field generator 124, stud finder 126, receiver 210, processor 212, input devices 214, and display 216. Metal detector 122, magnetic field generator 124, and stud finder 126 may be configured as detailed in relation to system 100 of FIG. 1. Additionally, wire pilot 110 may include wire snake coupling 114. Wire snake coupling 114 may allow wire snake 230 to be connected and disconnected from wire pilot 110.

Receiver 210 of remote guide 120 may be configured to communicate with beacon 220. Beacon 220 may be a device that is configured to be located in a position that an installer can use as a reference point, such as near where a wire is inserted into a wall. Receiver 210 may be configured to communicate with beacon 220 to determine a distance between beacon 220 and receiver 210. Such distances may include a vertical and/or a horizontal distance. In some embodiments, the distance determined may be in a straight line between beacon 220 and receiver 210. Measurement of such a distance may be useful when a wire is being installed within a wall that extends through multiple rooms. As such, it may be possible to determine the distance from where the wire pilot first entered the wall and/or to determine where a wire pilot is expected to be. For example, if a wire pilot is lowered into a wall from an attic approximately 6 feet, beacon 220 may be placed near where the wire and wire pilot 110 entered the wall. Once the installer is in a room adjacent to the wall, remote guide 120 in conjunction with receiver 210 and beacon 220 may be used to determine approximately where wire pilot 110 should be located within the wall by locating a distance of approximately 6 feet below beacon 220.

Beacon 220 may be configured to periodically emit a signal that can be measured using receiver 210 of remote guide 120. In some embodiments, receiver 210 may be a transceiver that is configured to transmit a signal to beacon 220 and receive a response from beacon 220 to determine the distance. Beacon 220 may be configured to be coupled with a wall, such as using a suction cup or hook. The beacon may emit sound, ultrasound, or use some other signal type to permit its location to be determined by the remote guide. The remote guide may be able to display a location of the beacon on display 216.

Processor 212 may be a general or specialized processor configured to receive and process information from other components of remote guide 120. For example, processor 112 may receive information from receiver 210 that processor 212 can use to compute a distance between remote guide 120 and beacon 220. Processor 112 may also be used to control information that is presented to the installer on display 216.

Processor 112 may be used in conjunction to map the interior of a wall. Remote guide 120 may be used to scan a wall. Based on the detected location of studs, wires, and/or other objects within the wall, remote guide 120 may determine an efficient route for a wire to be routed within the wall. In order to perform such a scan, a user may be required to move remote guide 120 along the exterior of the wall in a pattern, such as a grid, to allow the interior of the wall to be mapped. A storage device, such as memory or a hard-drive within remote guide 120 may be used to store the mapping of the interior of the wall.

Input devices 214 may be configured to receive input from the installer in order to control operation of remote guide 120. Input devices 214 may include an input device configured to allow an installer to select between using metal detector 122, stud finder 126, magnetic field generator 124, and/or receiver 210. Magnetic field generator 124 may be associated with a separate user input device of input devices 214. Such an input device may be used to trigger whether magnetic field generator 124 is engaged to create a magnetic field or not create a magnetic field.

Display 216 may be a multifunction display configured to provide an installer with information pertinent to the operation of remote guide 120. Operation of display 216 may be at least partially based on whether an installer has selected, via an input device of input devices 214, metal detector 122, stud finder 126, or receiver 210 for operation. When metal detector 122 is selected, display 216 may indicate whether or not metal is present in the direction remote guide 120 is pointed. In some embodiments, an arrow, or some other graphic, displayed by display 216 may indicate a direction of metal detected by metal detector 122. Display 216 may also indicate when metal is detected by metal detector 122, whether the metal is a wire, wire pilot 110, or some other item. It may be possible to distinguish between a wire, wire pilot 110, or some other item by the amount of metal detected by metal detector 122.

When stud finder 126 is selected for operation, display 216 may indicate whether or not a stud is present in the direction remote guide 120 is pointed. In some embodiments, an arrow, or some other graphic, displayed by display 216 may indicate a direction of a stud detected by stud finder 126. When receiver 210 is selected for operation, display 216 may indicate a distance between remote guide 120 and beacon 220. In some embodiments, an arrow, or some other graphic, may be displayed by display 216 to indicate the direction of beacon 220.

Wire snake 230 may be configured to be physically connected with wire pilot 110. Wire snake 230 may be configured to be used to push and/or pull wire pilot 110 within a wall. In some embodiments, wire snake 230 may be firm to allow wire snake 230 to effectively be pushed into a wall and to provide force to wire pilot 110. In some situations, an installer may be attempting to move wire pilot 110 along rough material within a wall (such as plaster) or through an object, such as insulation or a hole in a stud. To do so, it may be beneficial for the installer to be able to supply additional force to wire pilot 110 in addition to the force that may be supplied via magnetic field generator 124 of remote guide 120. As such, wire snake 230 may be physically connected to wire pilot 110. The installer or a second installer may be able to provide force to wire pilot 110 by pushing or pulling wire snake 230 while magnetic field generator 124 of remote guide 120 is also used to manipulate wire pilot 110. As such, wire snake 230 may be used to supply the force necessary to push or pull wire pilot 110 while magnetic field generator 124 of remote guide 120 is used to guide wire pilot 110 to the proper destination point. As another example, magnetic field generator 124 of remote guide 120 may be used to move wire pilot 110 such that it is in the proper location to move through a hole present within a stud inside the wall. Wire snake 230 may be used to provide the force necessary to push or pull wire pilot 110 through the hole in the stud.

In some embodiments, rather than coupling a wire directly to wire pilot 110, only wire snake 230 may be coupled to wire pilot 110. Once wire snake 230 has been routed between where a wire is intended to enter and where it is intended to exit a wall, wire snake 230 may be detached from wire pilot 110 and connected to the wire that is to be installed within the wall. Wire snake 230 may then be pushed or pulled back along the route through which it was inserted in the wall, thus resulting in the wire being routed between the entry point and destination point within the wall.

Figure 3:
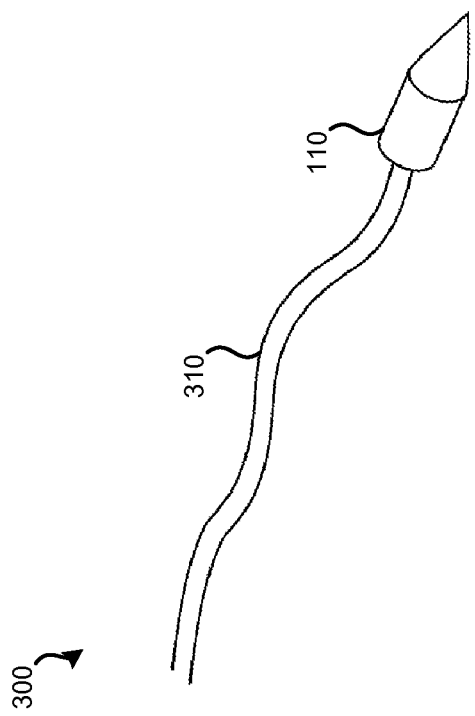
FIG. 3 illustrates an embodiment of a wire pilot coupled with a wire.

FIG. 3 illustrates an embodiment 300 of wire pilot 110 coupled with wire 310. As can be seen in FIG. 3, wire pilot 110 may be shaped to facilitate movement through or around objects within a wall. For example, having wire pilot 110 be pointed may facilitate moving wire pilot 110 through insulation and/or holes within studs inside of the wall. Wire 310 may be any type of wire that is desired to be routed within a wall, such as coaxial cable. Alternatively, wire pilot 110 may be coupled with a string. Wire coupling 114 (not illustrated) may be used to couple wire 310 to wire pilot 110. Wire 310 may clip into, screw into, or otherwise couple with wire coupling 114. Wire pilot 110 may be fully or partially constructed using a magnetically reactive material, such as iron. It may also be possible to connect wire pilot 110 with a wire snake (not illustrated) to allow wire pilot 110 to be mechanically pushed and/or mechanically pulled within a wall.

Figure 4:
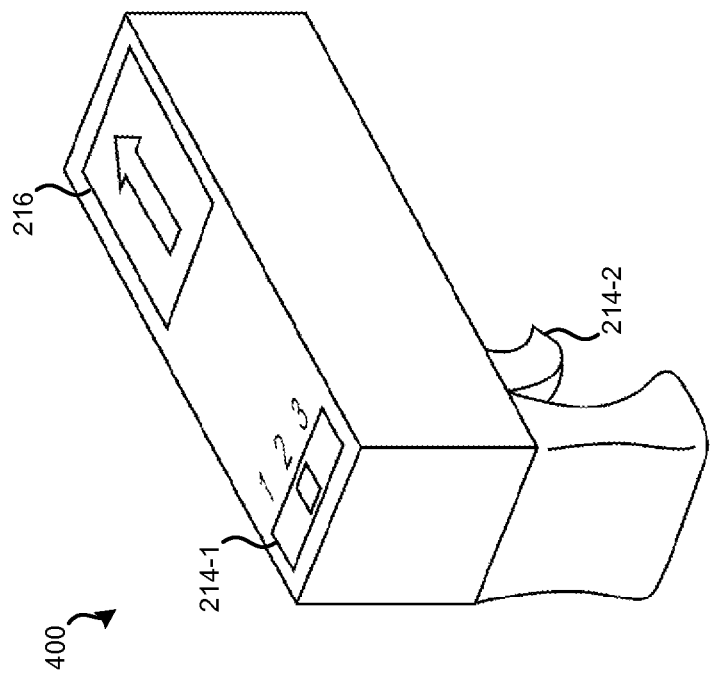
FIG. 4 illustrates an embodiment of a remote guide.

FIG. 4 illustrates an embodiment 400 of a remote guide. The remote guide of embodiment 400 may represent remote guide 120 of FIGS. 1 and 2. User input 214-1 may permit a user to select between using the metal detector 122, stud finder 126, or receiver 210. User input 214-2 may be used to engage and disengage magnetic field generator 124. As such, magnetic field generator 124 may be engaged when the trigger of user input 214-2 is pulled.

Information displayed by display 216 may correspond to the function selected using user input 214-1. Assuming option two of user input 214-1 corresponds to metal detector 112, the arrow displayed by display 216 may indicate the direction of metal within a wall. The color of the arrow may vary depending on whether it is determined the metal within the wall is a wire pilot, a wire, or some other metallic object.

Other components of the remote guide may be within the case of the illustrated remote guide and may not be visible. Having the remote guide shaped as illustrated is only an exemplary embodiment, other designs may be possible.

Figure 5:
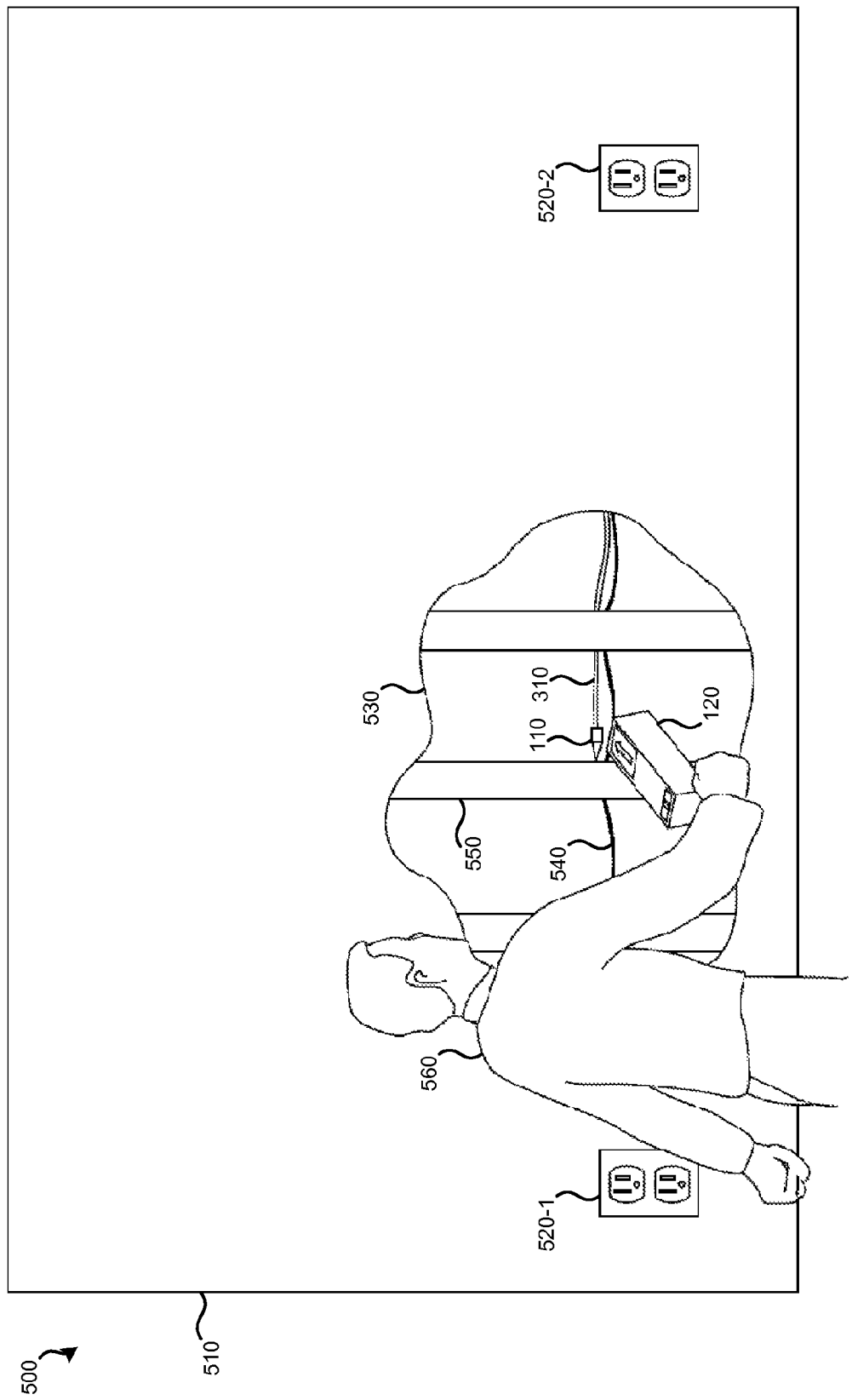
FIG. 5 illustrates an embodiment of a system configured for remotely manipulating a wire being used to guide a wire within a wall.

FIG. 5 illustrates an embodiment 500 of a system being used to guide a wire within a wall. System 500 may represent the systems and devices of FIGS. 1 through 4 being used by an installer to install a wire within a wall. In embodiment 500, wall 510 has previously been installed and finished. As such, wall 510 comprises exterior drywall (or some other surface material). Wall 510 also includes some number of supporting studs, such as stud 550. Stud 550, along with other components within wall 510 are visible in FIG. 5 through imaginary cutaway 530. Cutaway 530 is provided to facilitate the reader's visualization; imaginary cutaway 530 is not present to installer 560. On wall 510, outlet 520-1 and outlet 520-2 may be present. Between outlets 520, wire 540 may be present. Wire 540 may have been previously installed within wall 510 such as at the time wall 510 was constructed. Wire 540 may be run between outlet 520-1 and outlet 520-2 through holes in the studs within wall 510, such as stud 550. Installer 560 may be desiring to install wire 310 within wall 510. For example, installer 560 may be installing a satellite dish within a home. The home may have been built some number of years ago and may not be wired for a rooftop satellite dish; as such, additional wire may be needed to run from the roof of the home (where the satellite dish is located) to where the television is located.

Previous to the situation of the illustrated embodiment 500, installer 560 may have coupled wire 310 to wire pilot 110. Wire pilot 110 and wire 310 may have been inserted into wall 510 at a location not illustrated. For example, wire 310 and wire pilot 110 may have been inserted into wall 510 from a hole cut into wall 510 in another room, from an attic, or from a basement. In embodiment 500, installer 560 is using wire pilot 110 and remote guide 120 to route wire 310 horizontally through wall 510.

Installer 560 may have determined that holes were present in the studs within wall 510. To do this, installer 560 may have noted that outlets 520 are present on wall 510. Using a metal detector of remote guide 120, installer 560 may have detected wire 540 running horizontally through wall 510. As such, because wire 540 is running horizontally through wall 510, installer 560 may deduce that studs within wall 510, such as stud 550, contain holes to allow wire 540 to be routed horizontally. As such, installer 560 may desire to route wire 310 through the holes present in the studs of wall 510.

Once installer 560 has determined that he is going to route wire 310 through the same holes present in the studs of wall 510 as wire 540, installer 560 may use remote guide 120 to magnetically move wire pilot 110. As shown in FIG. 5, installer 560 is squeezing a trigger of remote guide 120 to activate a magnetic field. The magnetic field generated by remote guide 120 is sufficient to move wire pilot 110. By moving remote guide 120 horizontally to the left, installer 560 may also be moving wire pilot 110 and coupled wire 310 in the same direction. As such, installer 560 may move wire pilot 110 through a hole in stud 550. Installer 560 may continue moving wire pilot 110 and coupled wire 310 using remote guide 120 to a desired destination point. At the desired destination, a preexisting hole may be present within wall 510 to extract wire pilot 110 and wire 310 (such as a junction box). In some embodiments, a hole may need to be created within wall 510 to extract wire 310 and wire pilot 110 at the desired destination point.

Installer 560 may also use remote guide 120 to locate studs within wall 510, such as stud 550. Additionally, if a beacon was placed by installer 560 at some location, such as where the wire and wire pilot 110 were inserted into wall 510, remote guide 120 may be used to determine the distance between remote guide 120 and the beacon.

While installer 560 is shown as moving wire pilot 110 and wire 310 horizontally to the left, it should be understood that this is for example purposes only. In other embodiments, a wire may need to be moved vertically up or down, horizontally to the right, or some other direction. In some embodiments, movement in multiple directions may be necessary (such as along a stud down from an attic, then horizontally).

Figure 6:
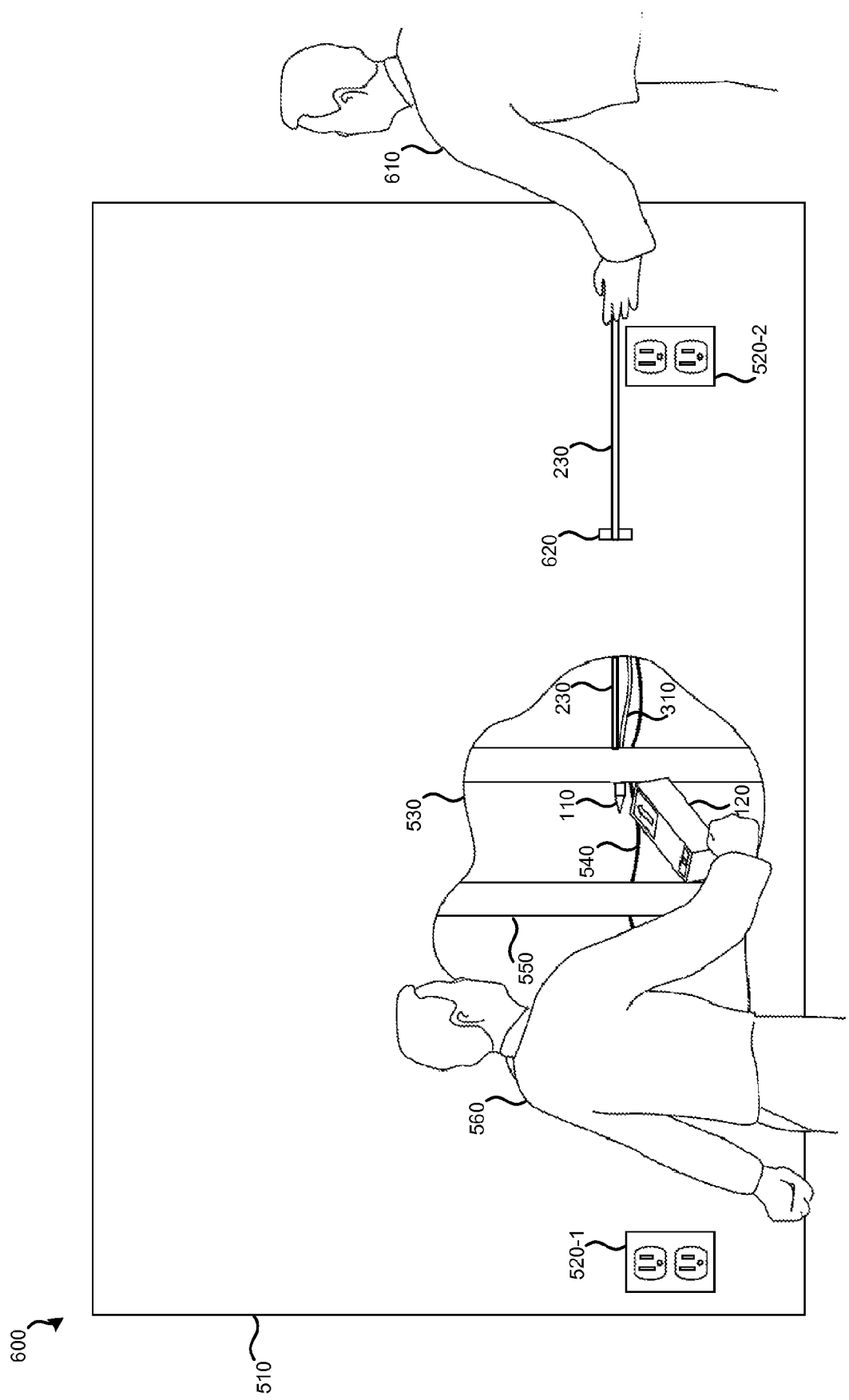
FIG. 6 illustrates another embodiment of a system configured for remotely manipulating a wire being used to guide a wire within a wall.

FIG. 6 illustrates another embodiment 600 of a system being used to guide a wire within a wall. In embodiment 600, installer 560 is being assisted by installer 610, who is using wire snake 230 to provide additional force to wire pilot 110. In embodiment 600, a magnetic field may be generated by remote guide 120 to move wire pilot 110. Force may also be provided to wire pilot 110 via wire snake 230. As such, wire snake 230 may apply mechanical force to wire pilot 110, while remote guide 120 provides force via a magnetic field.

Hole 620 may be made in wall 510 to allow wire snake 230 to be inserted. Wire snake 230 may be coupled with wire pilot 110. The additional force supplied to wire pilot 110 via wire snake 230 may help move wire pilot 110 through obstacles within wall 510, such as insulation and/or holes within studs. In embodiment 600, wire 310 is being routed through the same holes in the studs of wall 510 as wire 540. As such, wire 310 is to be routed through a hole in stud 550 that wire 540 passes through. Installer 610 may push on wire snake 230 while installer 560 uses remote guide 120 to magnetically guide wire pilot 110 through the hole in stud 550 that wire 540 passes through. This may continue through additional studs until wire 310 is routed to near the desired destination. At the destination, a new or preexisting hole in wall 510 may be used to remove wire pilot 110. Wire snake 230 may be disconnected, and pulled back along the same path it was inserted through hole 620.

While embodiment 600 illustrates a firm wire snake 230 being used to push wire pilot 110, it should be understood that wire snake 230 may also be used to pull wire pilot 110 and wire 310 within a wall. Further, embodiment 600 illustrates installer 560 and installer 610 installing wire 310 within wall 510 horizontally. In other embodiments, a wire may be installed vertically or in some other direction within a wall.

As discussed in relation to FIG. 5, installer 560 may also have used remote guide 120 to locate studs within wall 510, such as stud 550. Additionally, if a beacon was placed by installer 560 at some location, such as where wire pilot 110 was inserted into the wall, remote guide 120 may be used to determine the distance between remote guide 120 and the beacon (not illustrated).

Figure 7:
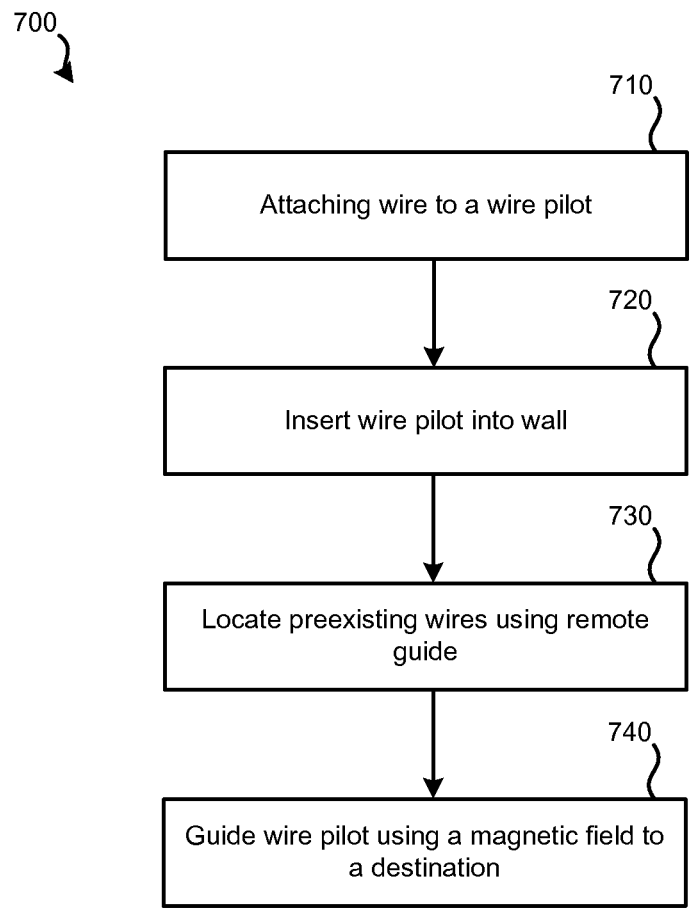
FIG. 7 illustrates an embodiment of a method for remotely manipulating a wire.

The systems of FIGS. 1 through 6 may be used to perform various methods. FIG. 7 illustrates an embodiment of a method 700 for remotely manipulating a wire. Method 700 may be performed using system 100 of FIG. 1, system 200 of FIG. 2, or some other system for remotely manipulating a wire within a wall. As such, means for performing method 700 may include a wire pilot and a remote guide.

At step 710, a wire may be coupled with a wire pilot. This may involve screwing an end of the wire into the wire pilot. In some embodiments, the wire pilot may have a clamp that clamps to the wire. In some embodiments, an end of the wire may be tied to the wire pilot. Those with skill in the art will understand the wire pilot may couple with the wire in additional ways.

At step 720, the wire pilot, along with the coupled wire, may be inserted into a wall. The wall may have been previously built, such that removing plaster or drywall (or some other surface material) is not a desired option. For instance, the plaster or drywall may be painted. As such, as little damage as possible may be desired to be inflicted on the wall when the wire is routed. Accordingly, the size and/or number of holes created in the wall to allow the wire to be routed may be desired to be minimized. To insert the wire pilot and wire into the wall, a preexisting hole or a new hole in the wall may be used. If a new hole is created, the hole may be just large enough for the wire pilot to enter the interior of the wall. In some embodiments, the wire pilot and wire may be inserted into the wall from an attic, a basement, or an exterior side of the wall. From such entry points, a hole may or may not need to be made.

At step 730, one or more previously installed wires may be located within the wall. The previously installed wires may be electrical, network, speaker, and/or television (e.g., cable, satellite, antenna) wires. The location of such wires may be used to determine possible routes for routing the wire being installed. If the previously installed wires run horizontally within a wall, it may be determined that holes within studs within the wall are present to allow the previously installed wires to run in such a direction. To locate the previously installed wires, the remote guide may be set to a metal detector mode. The remote guide may then be passed along the exterior of the wall until the metal detector locates metal within the wall. If the metal within the wall is determined to be a previously installed wire, the installer may attempt to trace the previously installed wire along the exterior of the wall to determine where the previously installed wire originates and terminates within the wall.

At step 740, the wire pilot may be magnetically moved by the remote guide within the wall to the destination where the wire is to exit the wall or otherwise terminate. A magnetic field may be generated by the remote guide to move the wire pilot. The magnetic field may be generated when a user input, such as a trigger pull, is received by the remote guide. The magnetic field created by the remote guide may attract the wire pilot. As such, the remote guide may be pulled along the wall to guide the wire pilot to where the wire is desired to exit the wall (or otherwise terminate). The wire pilot may be shaped such that as the wire pilot is being moved by the remote guide, it can move through or around obstacles. For instance, if the wire pilot is cone shaped, moving through insulation or holes in studs may be easier.

As an example of method 700, if a satellite dish is being installed, a coaxial cable may need to run from the satellite dish to a television. If the satellite dish is installed on a roof, the coaxial cable may enter the building through a roof (or eave) into an attic. From the attic, the inside of a wall may be entered to route the wire. The wire may be inserted into the wall with the wire pilot coupled. The installer may use the remote guide to locate previously installed wires within the wall to either avoid such wires or route the new wire along the same path. The installer may then use the remote guide to generate a magnetic field to move the wire pilot. The installer may move the remote guide along the exterior of the wall to move the wire pilot to the desired destination.

Figure 8:
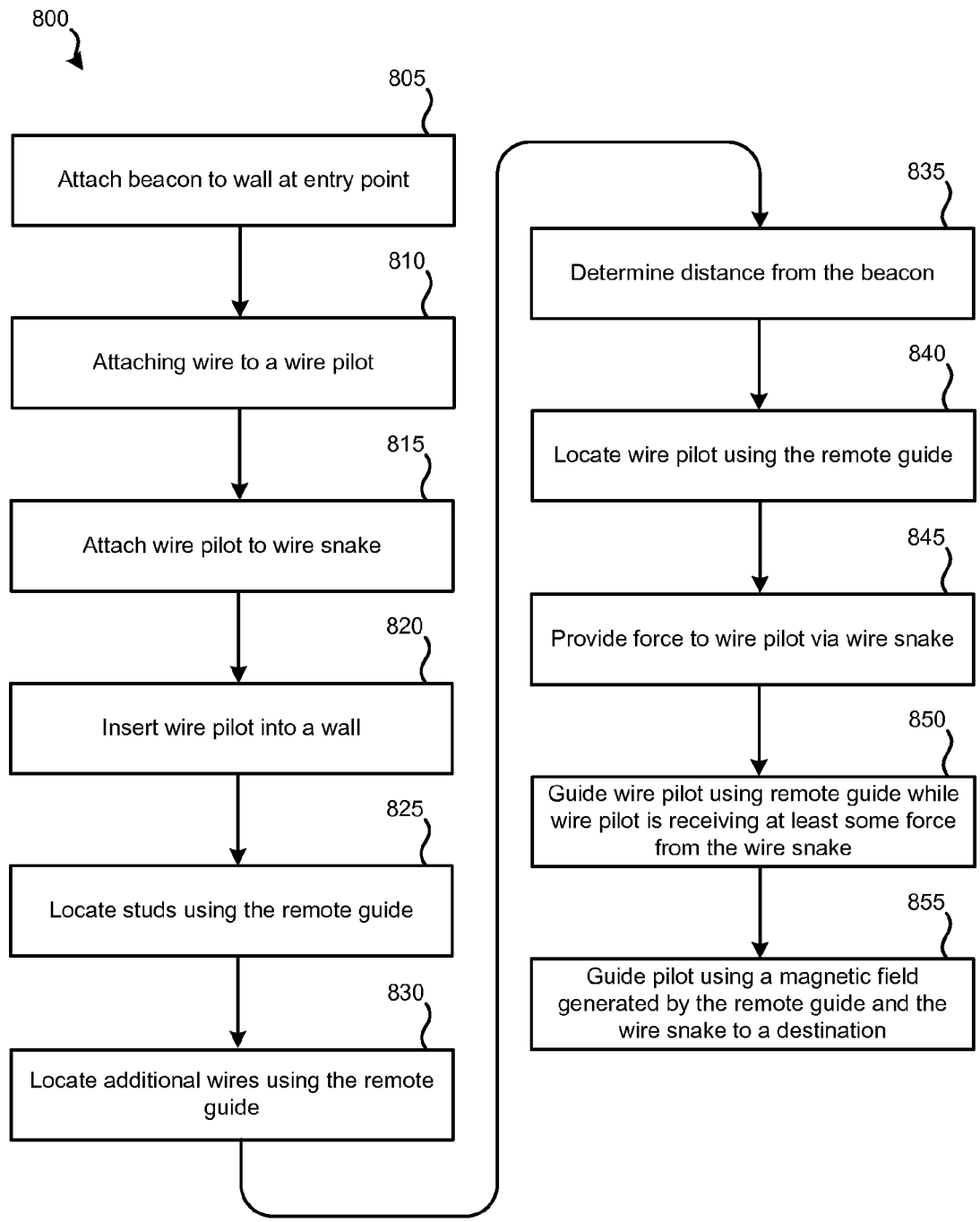
FIG. 8 illustrates another embodiment of a method for remotely manipulating a wire.

FIG. 8 illustrates another embodiment of a method for remotely manipulating a wire. Method 800 may be performed using system 100 of FIG. 1, system 200 of FIG. 2, or some other system for remotely manipulating a wire within a wall. As such, means for performing method 800 may include a wire pilot, a remote guide, a wire snake, and/or a beacon. Method 800 may represent an embodiment of method 700 or a separate method.

At step 805, a beacon may be coupled with a wall (or other surface) at or near where a wire is to be inserted. This beacon may be used to wirelessly determine a distance from the hole to the remote guide. While performing method 800, an installer may find it useful to determine the distance from the wire insertion point to where the installer is holding the remote guide. This may be especially useful if the installer is in another room or is on the opposite side of the wall.

For example, consider a television satellite dish being installed on the outside of a wall of a building having an outdoor side and an indoor side. Between the outdoor side and the indoor side of the wall may be an interior to the wall that may include objects such as insulation, nails, previously installed wires, and/or studs. A hole may be drilled into the outdoor side of the wall for a wire to be installed between the satellite dish and a television. In order to locate the proper place to make a hole for the wire in the wall on the indoor side of the wall, it may be useful to determine a distance to a beacon placed at or near the hole on the exterior side of the wall. For example, the shortest distance between the beacon and the remote guide when the remote guide is held against the indoor side of the wall may indicate that the hole on the outdoor side of the wall is directly behind where the remote guide is being held.

At step 810, a wire may be coupled with a wire pilot. This may involve screwing an end of the wire into the wire pilot. In some embodiments, the wire pilot may have a clamp that is clamped to the wire. In some embodiments, an end of the wire may be tied to the wire pilot. Those with skill in the art will understand the wire pilot may couple with the wire in additional ways.

At step 815, the wire pilot may be coupled with a wire snake. The wire snake may be firm, such that the wire snake may be used to push and/or pull the wire pilot (with the coupled wire) inside of a wall. In some embodiments, the wire pilot may be pushed, pulled, or otherwise manipulated by a second installer via the wire snake, while the first installer uses the remote guide to assist in maneuvering the wire pilot and coupled wire.

At step 820, the wire pilot with the coupled wire and/or wire snake may be inserted into a wall through a new or preexisting hole. In some embodiments, a hole may not be necessary, such as if a wall is being entered from an attic or basement. In some embodiments, a wire pilot with a wire coupled may be inserted into a wall, with the wire snake being coupled later via a different hole or other opening in the wall. For example, referring to FIG. 6, hole 620 allows wire snake 230 to couple with wire pilot 110. However, wire pilot 110 may not have been inserted into wall 510 via hole 620. Rather, another hole or other entry point into wall 510 may have been used for wire pilot 110, with wire snake 230 being coupled with wire pilot 110 when wire pilot 110 was in the vicinity of hole 620.

At step 825, an installer may use the remote guide to locate studs within the wall. To locate studs within the wall, the installer may set the remote guide to a stud-finder mode. The installer may move the remote guide along the exterior of the wall. As a stud is passed over, the remote guide may emit a sound and/or display an indication that a stud is likely within the wall where the remote guide is pointing.

At step 830, one or more previously installed wires may be located within the wall. The previously installed wires may be electrical, network, speaker, and/or television (e.g., cable, satellite, antenna) wires. The location of such wires may be used to determine possible routes for routing the wire being installed. If the previously installed wires run horizontally within a wall, it may be determined that holes within the studs of the wall are present that allow the previously installed wires to run in such a direction. To locate the previously installed wires, the remote guide may be set to a metal detector mode. The remote guide may then be passed along the exterior of the wall to permit the metal detector to locate metal within the wall. If the metal within the wall is determined to be a wire, the installer may attempt to trace the wire along the exterior of the wall to determine where the wire originates and terminates within the wall.

The metal detector of the remote guide may also be used to locate the wire pilot. For example, if, after the wire pilot has been inserted into the wall at step 820, the installer has lost track of its location, the metal detector of the remote guide may be used to locate the wire pilot. The remote guide may be able to distinguish between the wire pilot and other wires (such as by the amount of metal present). Based on whether the wire pilot or a wire is detected, a different sound may be made by the remote guide and/or a different graphic may be displayed by a display of the remote guide.

At step 835, a distance may be determined from the beacon coupled with the wall at step 805 and the remote guide. To do this, the remote guide may be set to a beacon mode by the installer. The remote guide may be moved around by the installer to determine a distance between the beacon and where the remote guide is located. The remote guide may also be able to determine a direction to the beacon. As such, it can be determined whether the remote guide is located above, below, or to a side of the beacon. For example, if the beacon is placed near a hole made into the top of a wall from an attic, in a room below the attic it may be useful to determine if the remote guide is approximately below the beacon to facilitate a wire being run vertically within the wall.

At step 840, if the location of the wire pilot within the wall is unknown, the metal detector of the remote guide may be used to locate it. In a situation where the wire pilot is being lowered into a wall from the top of the wall, such as from an attic, it may be useful to use the wire guide to locate the wire pilot after the wire pilot has been lowered a distance within the wall. The remote guide may be moved along the exterior of the wall until the remote guide indicates the wire pilot is in the direction indicated by the remote guide.

At step 845, force to move the wire pilot may be provided by an installer via the wire snake. The installer may push, pull, or otherwise manipulate the wire snake that is connected with the wire pilot.

At step 850, the same or a different installer may also be moving the wire pilot, during, before, or after step 845 is performed, using a magnetic field generated by the remote guide. A magnetic field may be generated by the remote guide to move the wire pilot. The magnetic field may be generated when a user input, such as a trigger pull, is identified by the remote guide. For example, while significant push or pull force may be supplied to the wire pilot via the wire snake, guiding or otherwise manipulating the wire pilot around or through objects may be accomplished using the magnetic field created by the remote guide.

For example, referring to FIG. 6, while installer 610 is pushing or pulling wire snake 230 to move wire pilot 110 horizontally, installer 560 may use remote guide 120 to manipulate wire pilot 110 vertically or in some other direction. As such, adjustments in the direction that wire pilot 110 is being pushed or pulled may be effected. In some embodiments, the remote guide may be used to move a wire pilot in the same direction that the wire snake is being used to push or pull the wire pilot. As such, additional force in the same direction may be applied to the wire pilot.

At step 855, the wire pilot may be guided by the remote guide and/or the wire snake within the wall to a destination where the wire is to terminate and/or exit the wall, such as a hole. The magnetic field created by the remote guide may attract or repulse the wire pilot. As such, the remote guide may be pulled or pushed along the interior of the wall to where the wire is desired. Additionally, the interior of the wall is three-dimensional. As such, it may be useful to be able to manipulate the write pilot within the wall perpendicularly to the exterior surface of the wall. Such movement may be useful when attempting to guide the wire pilot through a hole in a stud. As such, while force is being supplied via an installer pushing or pulling on the wire snake, the remote guide may be used to guide the wire pilot perpendicularly to the surface of the wall which the wire pilot is within. Such guiding may be accomplished by attracting or repulsing the wire pilot by the remote guide.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An apparatus configured to remotely manipulate a wire, the apparatus comprising:
   a pointed wire pilot formed at least partially from a magnetic material, configured to be coupled with the wire and to move in response to a magnetic field created by a remote guide when the wire pilot is within a wall and the remote guide is external to the wall; and
   the remote guide, comprising:
   a magnetic field generator configured to create the magnetic field at least partially based on user input to attract or repulse the wire pilot; and
   a metal detector configured to detect wires within the wall and to distinguish the wire pilot from the wires.

2. The apparatus configured to remotely manipulate the wire of claim 1, further comprising: a wire snake configured to be coupled with the wire pilot.

3. The apparatus configured to remotely manipulate the wire of claim 2, wherein the wire snake is configured to allow mechanical force to be applied to the wire pilot by a user while the remote guide is being used to create the magnetic field to move the wire pilot.

4. The apparatus configured to remotely manipulate the wire of claim 1, the apparatus further comprising:
   a beacon configured for use in determining a distance between the beacon and the remote guide, wherein the remote guide is further configured to output an indication of the distance between the beacon and the remote guide.

5. The apparatus configured to remotely manipulate the wire of claim 1 wherein the remote guide further comprises: a stud finder.

6. A method for remotely manipulating a wire within a wall, the method comprising:
   providing a wire pilot that is pointed and formed at least partially from a magnetic material and a remote guide that includes a magnetic field generator configured to create a magnetic field and a metal detector configured to detect wires within the wall and distinguish the wire pilot from the wires, wherein:
   the wire pilot is configured to be coupled with the wire and to move in response to a magnetic field generated by the remote guide when the wire pilot is within an interior of the wall and the remote guide is external to the wall;
   attaching the wire to the wire pilot;
   inserting the wire pilot and the attached wire into the interior of the wall;
   locating a previously routed wire within the interior of the wall using the metal detector;
   attaching a beacon to the wall;
   locating the wire pilot using the remote guide;
   determining, using the remote guide, a distance between the remote guide to the beacon and a direction from the remote guide to the beacon; and
   guiding, using the magnetic field generated by the remote guide, the wire pilot and the attached wire to a destination within the interior of the wall.

7. The method for remotely manipulating the wire within the wall of claim 6, wherein guiding the wire pilot and the attached wire to the destination within the interior of the wall comprises activating and deactivating the magnetic field generated by the remote guide.

8. The method for remotely manipulating the wire within the wall of claim 6, further comprising locating a stud within the interior of the wall using the remote guide.

9. The method for remotely manipulating the wire within the wall of claim 6, further comprising attaching the wire pilot and the attached wire to a wire snake.

10. The method for remotely manipulating the wire within the wall of claim 9, wherein guiding, using the magnetic field generated by the remote guide, the wire pilot and the attached wire to the destination within the interior of the wall further comprises moving the wire pilot and the attached wire using the wire snake.

11. The method for remotely manipulating the wire within the wall of claim 9, wherein the remote guide is operated by a first user and the wire snake is operated by a second user.

12. The method for remotely manipulating the wire within the wall of claim 7, wherein guiding, using the magnetic field generated by the remote guide, the wire pilot and the attached wire to the destination within the interior of the wall comprises passing through a preexisting hole within a stud present within the interior of the wall.

13. An apparatus for remotely manipulating a wire within a wall, the apparatus comprising:
   a first means for coupling with the wire, wherein the first means is pointed and formed at least partially from a magnetic material, and is configured to move in response to a magnetic field when the first means is within an interior of the wall;
   a second means for locating the first means within the interior of the wall; and
   a third means for guiding, using the magnetic field, the first means and the attached wire to a destination within the interior of the wall; and
   a fourth means for detecting wires within the interior of the wall and that distinguishes the first means from the wires.

14. The apparatus for remotely manipulating the wire within the wall of claim 13, the apparatus further comprising:
a means for locating a stud within the interior of the wall.

15. The apparatus for remotely manipulating the wire within the wall of claim 14, the apparatus further comprising:
a means configured to: couple with the first means; and move the first means while the third means is being used to guide the first means and the attached wire to the destination within the interior of the wall.

16. The apparatus of claim 1, wherein the remote guide further comprises a processor that receives information from the remote guide to generate a map of an interior of the wall.

17. The apparatus of claim 1, wherein the remote guide further comprises a display that includes an indicator of whether a sensed material is a wire or the wire pilot.

18. The apparatus of claim 1, wherein the remote guide comprises an output comprising a sound or a graphic, and wherein the remote guide produces a first output response when identifying a wire, and a second output response different from the first when identifying the wire pilot.

* * * * *